Dec. 31, 1963  R. J. HEALEY  3,116,446
RECTIFIER CONTROL CIRCUIT
Filed Aug. 5, 1959
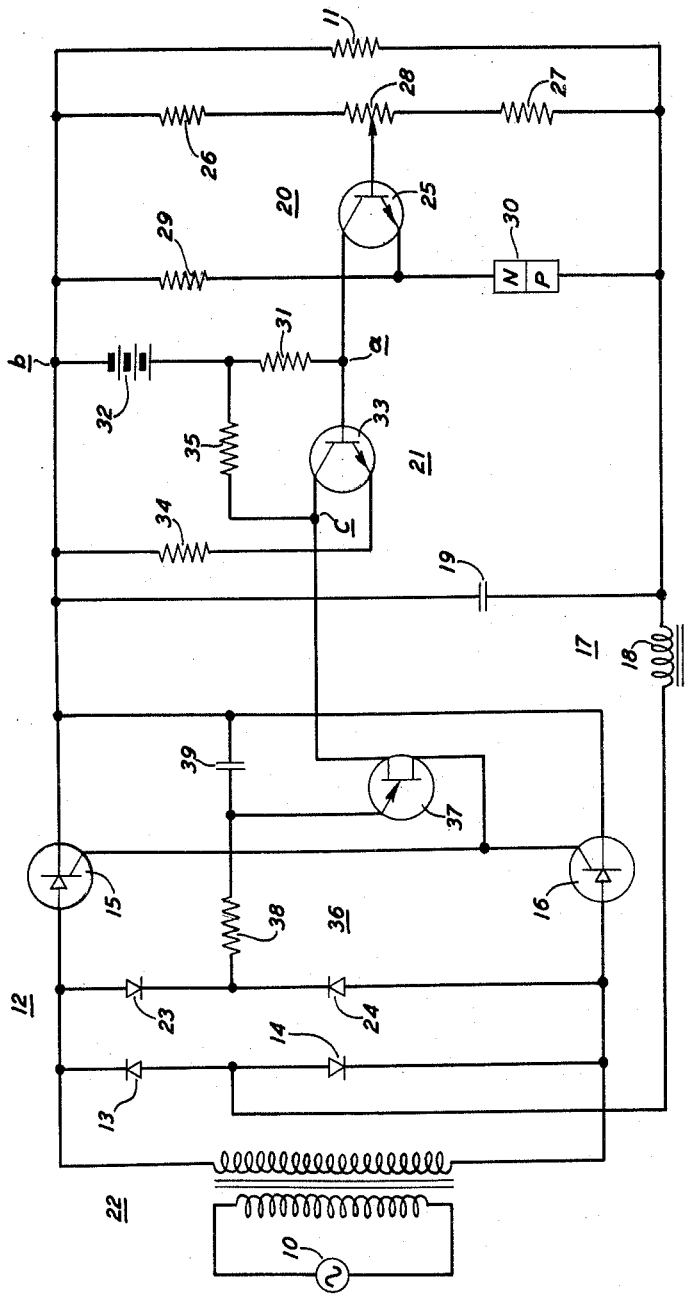
INVENTOR
R. J. HEALEY
BY
ATTORNEY

# United States Patent Office 3,116,446
Patented Dec. 31, 1963

3,116,446
RECTIFIER CONTROL CIRCUIT
Robert J. Healey, Fanwood, N.J., assignor to Bell Telephone Laboratories, Incorporated, New York, N.Y., a corporation of New York
Filed Aug. 5, 1959, Ser. No. 831,870
7 Claims. (Cl. 321—18)

This invention relates to current supply apparatus and particularly to improvements in regulated power supplies.

One class of regulated current supply apparatus is arranged to accept current from an unregulated alternating-current source and to produce a regulated direct-current output. Such supplies involve rectification in addition to regulation and typically employ a thyratron or thyratron-like element for the rectifying device. This rectifying device may be either the well-known gas-filled thyratron or the relatively new solid-state three-terminal PNPN switch which has many thyratron-like characteristics. Such PNPN switches have been described by I. M. Mackintosh in the Proceedings of the I.R.E., vol. 46, No. 6, pages 1229 through 1235. Their use in various circuits and in particular as rectifiers having variable firing angles in a regulated power supply has also been described by R. P. Frenzel and F. W. Gutzwiller in Electronics, vol. 31, No. 13, pages 52 through 55, and by F. W. Gutzwiller in Control Engineering, vol. 6, No. 5, pages 113 through 119.

The three-terminal PNPN switch is a four-region semiconductor structure having electrical connections to both outer (emitter) regions and to one of the inner (base) regions. When these three-terminal PNPN switches are used as controlled rectifiers, they are functionally equivalent to a gas thyratron tube. Therefore, the regions having the electrical connections are designated the anode (outer P region), the cathode (outer N region), and the gate (usually the inner P region). When the anode is negative with respect to the cathode, the rectifier exhibits a very high impedance, blocking the flow of current in the anode circuit. Even when the anode is positive, but at a value less than that which will break down the switch and cause conduction, the controlled rectifier still blocks the flow of current until an appropriate firing signal is applied to the gate-cathode circuit. With the rectifier in the state of conduction, anode current is limited by the external circuit and is no longer subject to control by the gate.

The duty cycle of a thyratron or thyratron-like solid-state rectifier and the time of turn-on or onset of conduction are variable in accordance with the relative magnitudes and phases of the gate or control and operating voltages or currents applied to them. Since there is a magnitude and/or phase relationship that will cause the thyratron or thyratron-like semiconductor switch to conduct, it is possible to effect either magnitude or phase control or both. One convenient way of considering control of a thyratron-like device is in terms of the firing angle which may be defined as the product of the angular frequency of the input voltage to the power supply and the time of turn-on with respect to the time of zero value of the positively increasing input voltage. Thus, when this control of the time of turn-on is realized, the firing angle of the thyratron is being controlled.

Regulated power supplies that use thyratrons, and particularly those that use PNPN switches as rectifying devices with automatic control of the firing angle in accordance with load voltage variations, are usually not stable for all firing angles. This is true because in circuit arrangements thus far employed a nonlinear relationship exists between the output voltage of the regulator and the voltage that is fed back from the output to control the firing angle of the rectifier elements. The resulting gain in the feedback path (or loop) is, accordingly, variable with the feedback voltage. This has a detrimental effect on the circuit stability in particularly, and the regulator performance in general.

The object of the present invention is, accordingly, to improve the circuit stability of regulated power supplies of the kind described above.

In accordance with the invention, therefore, the control of the regulator is made a linear function of the output voltage by varying the firing angle of the rectifier element as an inverse trigonometric function of the product of the feedback voltage and a constant which is a characteristic of the feedback circuitry. When the firing angle is varied in this manner, a linear relationship is achieved between the output voltage and the voltage that is fed back from the output to control the firing angle of the rectifier element. The consequent gain in the feedback path is a constant for all firing angles so that increased stability results.

Advantageously, and particularly in a control circuit for a PNPN switch used as a controlled rectifier in a regulated power supply, the control circuit effects a relationship whereby the cosine of the firing angle of the switch is made directly proportional to the feedback voltage.

These and other features and advantages of the invention will appear more clearly and fully upon consideration of the following specification taken with the drawing, the single FIGURE of which is a schematic circuit diagram of a regulated power supply in accordance with the present invention.

As shown in the drawing, there is provided a regulator circuit for accepting current from an alternating-current source 10 and for supplying a rectified current to a load 11 which may vary. The alternating input current is rectified by a controlled rectifier 12 comprising rectifying diodes 13 and 14 and rectifying three-terminal PNPN switches 15 and 16. The ripple filter 17 comprising a series inductor 18 and a shunt capacitor 19 suppresses alternating components of the rectified output. A detector 20 is provided for detecting load voltage or line voltage variations and a direct-current amplifier 21 amplifies the output of detector 20 for application to a trigger and control circuit which acts to determine the duty cycle and thus the output voltage of the controlled rectifier.

The alternating-current supply 10 is connected to the primary winding of a transformer 22. One terminal of the secondary winding of transformer 22 is connected to the common junction of diodes 13 and 23 and PNPN switch 15 and the other terminal is similarly connected to the common junction of diodes 14 and 24 and PNPN switch 16.

When the upper terminal of the secondary of transformer 22 is positive with respect to the lower terminal, a circuit for supplying current to the load 11 may be traced from this upper terminal through PNPN switch 15, load 11, inductor 18 and rectifying diode 14 to the lower terminal of the secondary transformer winding. A similar unidirectional current path may be traced from the lower terminal of the secondary of transformer 22 when it is positive with respect to the upper terminal, through PNPN switch 16, load 11, inductor 18 and rectifying diode 13 to the upper terminal of the secondary transformer winding.

These two current paths will exist alternately as first one PNPN switch conducts and then the other. The ability of these switches to conduct is determined by the relative magnitudes and phases of the voltages between their anode and cathode electrodes and by the currents through their gate-cathode junctions. This last current is supplied as a pulse which occurs at a time determined by the control circuitry in response to the output voltage supplied to the load. This circuitry is controlled by detector 20 connected effectively across load 11.

The detector comprises a transistor 25 together with an input potential dividing network including resistors 26 and 27 and potentiometer 28 connected in series across the output of the rectifier and another potential dividing network including a resistor 29 and a constant voltage PN junction diode 30 also connected in series across the rectifier output. The base of transistor 25 is connected to the wiper arm of potentiometer 28 and the emitter is connected to the junction of diode 30 and resistor 29. The input to transistor 25 is derived between the base and emitter electrodes of this transistor. Since the emitter is connected to the constant voltage diode 30 with respect to the lower terminal of resistor 27, the input to transistor 25, and thereby detector 20, varies directly as the voltage between the wiper arm of potentiometer 28 and the lower terminal of resistor 27, which varies directly as the output voltage of the rectifier.

The output of the detector is developed across a resistor 31 which is connected between the collector of transistor 25 and a current supply source 32. As the current through transistor 25 varies in accordance with the rectifier output voltage variations, the voltage across resistor 31 varies. The voltage across resistor 31 appears as the input signal between the base and emitter electrodes of the transistor 33 which forms the active element of a direct-current amplifier 21. The emitter of transistor 33 is electrically connected to the base through a resistor 34, current supply source 32 and resistor 31. The output of the direct-current amplifier 21 is developed across a resistor 35 which is connected between the collector of transistor 33 and current supply source 32.

The output of direct-current amplifier 21 appears also as an input to a control circuit 36 which is provided for controlling the time of turn-on or the firing angle of the PNPN switches 15 and 16. This control circuit comprises a unijunction transistor (double-base diode) 37 and a triggering circuit connected to its emitter which includes a resistor 38, a capacitor 39 and diodes 23 and 24. The unijunction transistor 37 is advantageously used in this control circuit to produce the current pulse necessary to turn on the controlled rectifiers 15 and 16. The pulse thus produced has a steep wavefront and is derived when capacitor 39 in the triggering circuit discharges through the decreased resistance existing between the emitter and lower base of transistor 37 and the resistance between the gate and cathode of rectifiers 15 and 16.

The resistance between the emitter and lower base of unijunction transistor 37 will decrease as the emitter-to-lower base current increases. This emitter-to-lower base current will increase as the voltage on capacitor 39 increases toward the value of the voltage across the unijunction transistor triggering circuit. A point exists as a characteristic of the unijunction transistor 37 where the transistor will enter its negative resistance region and will then allow capacitor 39 to discharge readily through its emitter-to-lower base junction. The unijunction transistor enters this negative resistance region when the voltage between its emitter and lower base (herein approximately the voltage on capacitor 39) becomes a certain proportionate value of the voltage between its upper base and lower base (herein approximately the feedback voltage from the rectifier output). If the voltage between the bases of unijunction transistor 37 increases as a result of the output voltage increasing, the capacitor 39 will have to charge to a higher value before the voltage between the emitter and lower base will attain the value necessary to cause the unijunction transistor to enter its negative resistance region thereby allowing capacitor 39 to discharge, producing a current pulse to turn on either switch 15 or switch 16. Since capacitor 39 has to charge to a higher value of voltage, the length of charging time is increased, the resistance-capacitance time constant of the triggering circuit remaining constant, and the time of turn on of the switches 15 and 16 is delayed to a later portion of the alternating input voltage cycle. As a result of the switches becoming conductive at a later time during the alternating input voltage cycle, the averae current out of the rectifier 12 will be less and the rectified output voltage will thereby be reduced and regulated.

When the potentiometer 28 is set at a fixed value, the transistors 25 and 33 will conduct at constant values of current and the voltage drop across resistors 31, 34, and 35 will be constant. The voltage at point $c$ at the upper base of unijunction transistor 37 will be more positive by a constant amount than the voltage at point $b$ at the common junction of the cathodes of the switches 15 and 16.

If the emitter-to-lower base resistance of unijunction transistor 37 is made to decrease while the constant voltage just described is applied to the upper base, a pulse of current will flow through the emitter-lower base circuit and thence through the gate-cathode junctions of the two PNPN switches 15 and 16. This pulse of current together with the alternating current applied to the anodes of the switches determines the time of turn-on for the switches. The triggering circuit of diodes 23 and 24, resistor 38 and capacitor 39 will act in conjunction with detector 20 to control the emitter-to-lower base resistance of transistor 37. Thus, this resistance will be made to decrease when the capacitor 39 charges to a certain proportionate value of the voltage between the upper base of transistor 37 and the common junction of the cathodes of switches 15 and 16.

The series combination of diode 23, resistor 38 and capacitor 39 is connected across the secondary winding of transformer 22 through the load 11 and the parallel paths across the load, inductor 18 and diode 14. In a similar manner, the series combination of diode 24, resistor 38 and capacitor 39 is connected across the secondary of transformer 22 through the load 11 and the parallel paths across the load, inductor 18 and diode 13. When the upper terminal of the secondary winding of transformer 22 becomes positive with respect to the lower terminal, there is a current path from this positive terminal through diode 23, resistor 38, capacitor 39, load 11, inductor 18 and diode 14 to the lower terminal of the secondary winding. This current flow will cause capacitor 39 to charge towards the value of the applied voltage. Thus resistor 38 and capacitor 39 form an RC integrating circuit across which the alternating voltage present at the secondary of transformer 22 is applied through diode 23, load 11, inductor 18, and diode 14.

When this applied voltage is a sine wave, the capacitor 39 will charge on a cosine curve toward the peak value of this applied voltage. There is a direct relationship between the time of turn-on or the firing angle of the switches 15 and 16 and the time at which the voltage across the capacitor 39 reaches the proportionate value necessary to place the unijunction transistor 37 in its negative resistance region, thereby producing the pulse of current to turn on either switch 15 or 16. This pulse of current may be traced from the junction of resistor 38 and capacitor 39 through the emitter-lower base junction of transistor 37 and the gate-cathode junctions of the switches 15 and 16 to the other side of the capacitor 39. Since capacitor 39 charges on a cosine curve and its charging time is determined by the magnitude of the base-to-base voltage of the unijunction transistor 37, the direct relationship between this capacitor's voltage and the firing angle makes the cosine of the firing angle directly proportional to the voltage between the bases of the unijunction transistor, which is approximately the feedback voltage from the output of the regulator.

The output voltage of a power supply utilizing controlled solid-state thyratrons as rectifiers varies directly as the cosine of the firing angle. Since, in accordance with the invention, the cosine of the firing angle varies directly as the feedback voltage as a result of the above-described control circuit, the output voltage thereby varies directly as the feedback voltage and the gain of the feedback path (or loop) is constant so that the regulator may be made stable for all firing angles.

When the upper terminal of the secondary of transformer 22 is positive, as is assumed, switch 15 will become conductive in response to the pulse of current through its gate-cathode junction. The series combination of diode 23, resistor 38 and capacitor 39 will be short-circuited by the low resistance of the now conducting switch 15, thereby allowing the capacitor 39 to attain a zero value of voltage in preparation for the time at which the lower terminal of the secondary of transformer 22 becomes positive with respect to the upper terminal of the secondary winding. When the lower terminal becomes positive, the capacitor 39 will charge through diode 24, resistor 38, inductor 18, load 11, and diode 13. When the capacitor 39 has charged to the necessary proportionate value of the base-to-base voltage of the transistor 37, the switch 16 will be enabled to conduct.

It is noted that either switch 15 or 16 will be conducting at nearly all times after the input voltage from source 10 is applied; although, the current flowing through the conducting switch does not flow through the secondary of transformer 22 at all times. At the completion of each half cycle of the input voltage and when the opposite end of the secondary of transformer 22 becomes positive, the energy stored in inductor 18 from the previous half cycle is given up, due to the filtering action of filter 17, to supply current through the then conducting switch until the control circuit 36 furnishes the pulse of current to turn on the other switch. It is this action and the fact that the voltage across the inductor 18 is opposite and nearly equal to the load voltage in the charging circuit of capacitor 39 that allow the voltage applied to the integrating circuit to be substantially only the alternating-current voltage across the secondary of transformer 22.

The regulator circuit operates to maintain the load voltage substantially constant for any fixed setting of potentiometer 28. Let it be assumed that the load voltage increases by a small amount due to an increase in line voltage or a decrease of load current, for example. The base of transistor 25 will become relatively more positive with respect to its emitter, and, as a result, increased current will flow through resistor 31 from the positive terminal of source 32 into the collector and out of the emitter of transistor 25, through the constant voltage diode 30, through inductor 18, and either through diode 13, the secondary winding of transformer 22 and PNPN switch 16 to the negative terminal of source 32 or through diode 14, the secondary winding of transformer 22 and PNPN switch 15 to the negative terminal of source 32, depending upon which PNPN switch is conducting.

The increased current through resistor 31 makes point $a$ relatively less positive with respect to point $b$, or in other words, it makes the base of transistor 33 relatively less positive with respect to its emitter, and, as a result, decreased current will flow through transistor 33 and, thereby through resistor 35 from the positive terminal of source 32 into the collector and out of the emitter of transistor 33 and through resistor 34 to the negative terminal of source 32. This decreased current flow through resistor 35 will make point $c$ relatively more positive with respect to point $b$. This positively increased voltage between points $c$ and $b$ will appear between the upper base of unijunction transistor 37 and the common connection of the cathode electrodes of PNPN switches 15 and 16. As this makes the voltage between the upper and lower base of transistor 37 larger, the capacitor 39 will have to charge to a higher value and for a longer time before the voltage on capacitor 39 is large enough to break down the emitter-to-lower base resistance of transistor 37 to furnish a pulse of current to put either switch 15 or 16 in the conducting state. Therefore, the time of turn-on with respect to the zero value of applied voltage is increased and thereby the firing angle is increased. This in turn decreases the average output current from the rectifier 12 and thereby reduces the output voltage to the desired value.

For the negative half cycle of the input alternating current or when the lower terminal of the secondary of transformer 22 becomes positive, the switch 16 will be conductive and its firing angle will be controlled by the control circuit to provide a regulated output.

When the output voltage decreases, the feedback voltage will be decreased and the capacitor 39 will have to charge to a lesser value before producing the firing pulse through unijunction transistor 37 to turn on the switches 15 and 16. There will be a shorter time required for the capacitor to charge to this lesser value; and, therefore the firing angle will be decreased. This will result in a greater average output rectified current because the switches will conduct for a longer portion of the alternating input current cycle; and, therefore, the output voltage will be increased to the desired value.

Although a specific embodiment of the invention has been shown and described, it will be understood that it is but illustrative and that various modifications may be made therein without departing from the scope and spirit of the invention.

What is claimed is:

1. In a regulated power supply providing direct-current voltage to a load from an alternating-current source, the combination comprising a thyratron-like semiconductor device connected between said source and said load, means coupled to said load for detecting variations in the voltage across said load, means connected to both said source and said means for detecting said variations for generating a pulse at the end of a variable time-interval following the occurrence of the zero value of a positively increasing voltage from said source, the duration of said time-interval being expressible as a firing angle having a magnitude equal to the product of the duration of said time-interval and the angular frequency of said increasing voltage, said generating means including timing means responsive to said detecting means for controlling the cosine of said firing angle in direct proportion to said variations in said load voltage, and means for applying said pulse to said thyratron-like semi-conductor device to initiate the flow of current from said source through said device to said load.

2. A regulated power supply according to claim 1 wherein said generating means comprises, in combination, the series combination of a resistor and a capacitor, means for applying said positively increasing voltage across said series combination, threshold means for detecting the point in time when the voltage appearing at the junction of said resistor and capacitor exceeds a variable level, said last-named means including means for varying the value of said level in direct proportion to said variations in said load voltage, and means for generating said turn-on pulse whenever said point in time is detected.

3. A regulated power supply according to claim 2 wherein the said threshold means includes a double-base diode having a first base, a second base, and an emitter, said first base being connected to said means for detecting variations in the voltage across said load, said second base being connected to said device, and said emitter being connected to the junction of said resistor and said capacitor.

4. In a regulated power supply providing direct-current voltage to a load from an alternating-current supply source, the combination comprising a first, a second, and a third circuit connected across said source, said first circuit including two rectifying elements having an anode and a cathode with a common anode junction, said second circuit including two controlled rectifying elements having an anode, a cathode, and a gate electrode with a common cathode junction, said controlled rectifying elements controlling the voltage across said load by virtue of providing a variable period of conduction related to a firing angle established by the time position of a gate-cathode signal relative to the zero crossing of the input voltage from said source, said third circuit including two nonlinear impedances having a common junction, means connecting said load between the common junctions of said first and said second circuits, means for detecting variations in the voltage across said load, and means for supplying the gate-cathode signal for said controlled rectifying elements, said supplying means including an integrating circuit comprising in series a resistor and a capacitor connected between the common junctions in said second and said third circuits and a double-base diode responsive to the relative magnitudes of the integrated voltage across said capacitor of said integrating means and the output voltage of said detector circuit, said supplying means controlling the firing angle of said controlled rectifying elements so that the voltage across said load remains substantially constant.

5. In combination, a circuit for supplying direct-current voltage to a load from an alternating-current supply source comprising, in series with the load with respect to the source, the anode-cathode path of a semiconductor device having an anode, a cathode, and a gate electrode, means connected across said load for detecting variations in load voltage, a control circuit responsive to said detecting means connected between the gate electrode of said device and said detecting means and providing a pulse of current through the gate-cathode path of said device to enable said device to conduct, said control circuit comprising an integrating circuit including a resistor and a capacitor connected in series between said anode and cathode of said device for integrating a portion of the cycle of the input voltage from said source, and a double-base diode connected between said detecting means and the junction of said resistor and capacitor, said diode arranged to present a high resistance in series with the gate-cathode path of said device with respect to the voltage across said capacitor of said integrating circuit during said portion of the cycle of the input voltage and a low resistance during the remainder of the input cycle so that the capacitor can discharge therethrough and enable said device to conduct.

6. In combination, a source of alternating current, a load, means comprising at least one thyratron-like semiconductor device for supplying rectified alternating current from said source to said load, means connected across said load for detecting variations in the voltage across said load and in the current through said load, control means responsive to said detecting means for controlling the current supplied to said load, said control means comprising a double-base diode having an emitter electrode and an integrating circuit including a series combination of a resistance and a capacitor connected across said device, means for applying the integrated voltage across said capacitor to the emitter electrode of said diode to produce a current pulse output from said diode, and means for applying said current pulse to said device for controlling the flow of current through and the voltage across said load.

7. The combination comprising an alternating-current voltage source, a direct-current load, at least one thyratron-like semiconductor device having an anode, a cathode, and a gate electrode, means for connecting in series said device, said source, and said load with said anode connected to said source and said cathode connected to said load so that said device rectifies the alternating-current input from said source, means for detecting variations in the voltage across said load, and a cathode-gate circuit for said device responsive to said detecting means for controlling the period of conduction of said device, said cathode-gate circuit comprising an integrating circuit connected between said anode and said cathode including a resistor, a capacitor, and a common junction therebetween, a double-base diode having a first base, a second base, and an emitter, said first base being connected to said gate electrode, said second base being connected to said detecting means, and said emitter being connected to said common junction.

References Cited in the file of this patent
UNITED STATES PATENTS

| 2,590,180 | Juhola | Mar. 25, 1952 |
| 2,688,721 | Bixby | Sept. 7, 1954 |
| 2,806,963 | Woll | Sept. 17, 1957 |
| 2,850,680 | Woll | Sept. 2, 1958 |

OTHER REFERENCES

"A Phase-Regulated Transistor Power Supply," by D. E. Devitch and H. J. Paz, published in IRE Transactions on Circuit Theory, September 1957; pp. 279–284.